United States Patent [19]

Hayes, Jr. et al.

[11] 3,957,539
[45] May 18, 1976

[54] BATTERY CELL COVER ASSEMBLY

[75] Inventors: William B. Hayes, Jr., Cinnaminson, N.J.; Richard L. Kreutzfeldt, Holland, Pa.

[73] Assignee: Gould Inc., Chicago, Ill.

[22] Filed: Feb. 14, 1975

[21] Appl. No.: 549,991

[52] U.S. Cl. .............................................. 136/170
[51] Int. Cl.² ........................................ H01M 2/04
[58] Field of Search .................................. 136/170

[56] References Cited
UNITED STATES PATENTS

| | | | |
|---|---|---|---|
| 1,581,568 | 4/1926 | Ford | 136/170 |
| 2,220,005 | 10/1940 | Smith | 136/170 |
| 3,343,996 | 9/1967 | Micksch et al. | 136/170 |

*Primary Examiner*—John H. Mack
*Assistant Examiner*—H. A. Feeley
*Attorney, Agent, or Firm*—Wolfe, Hubbard, Leydig, Voit & Osann, Ltd.

[57] ABSTRACT

A battery cell cover assembly in which the cover is fitted in the cell walls of the jar and is formed to define a deep groove bottomed by hinged sealing strips formed integrally with the cover for receiving a flowable, settable sealant compound; the strips give significant tolerance flexibility between the cover and the jar, and the groove is sufficiently deep to permit good sealing even when the cover top is raised well clear of the top of the jar.

2 Claims, 4 Drawing Figures

U.S. Patent    May 18, 1976    3,957,539
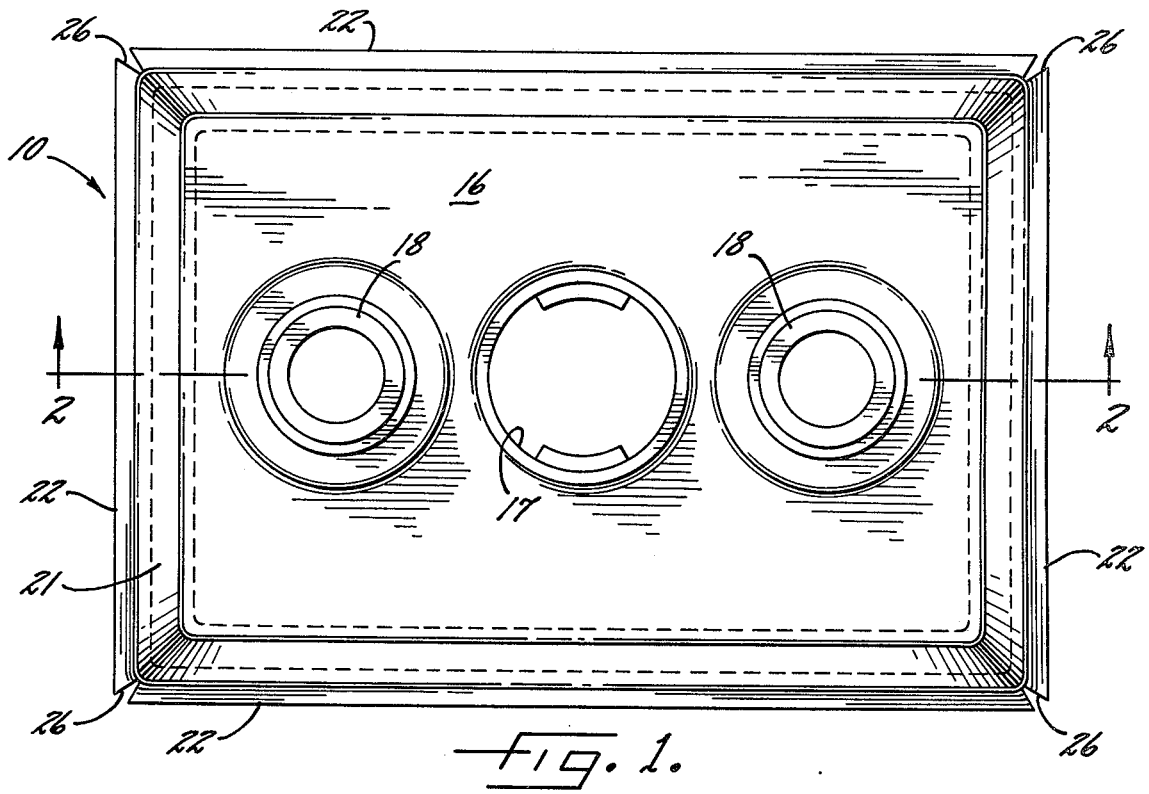
Fig. 1.
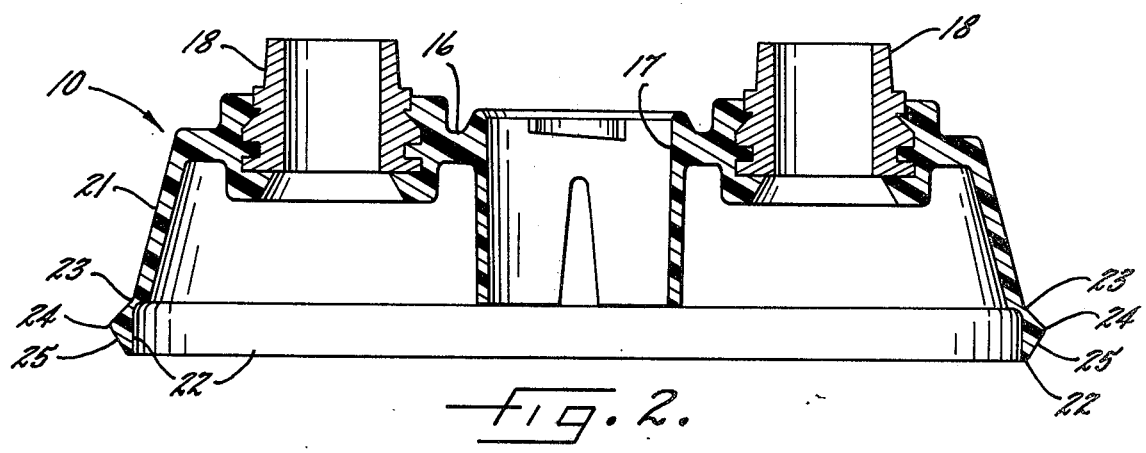
Fig. 2.
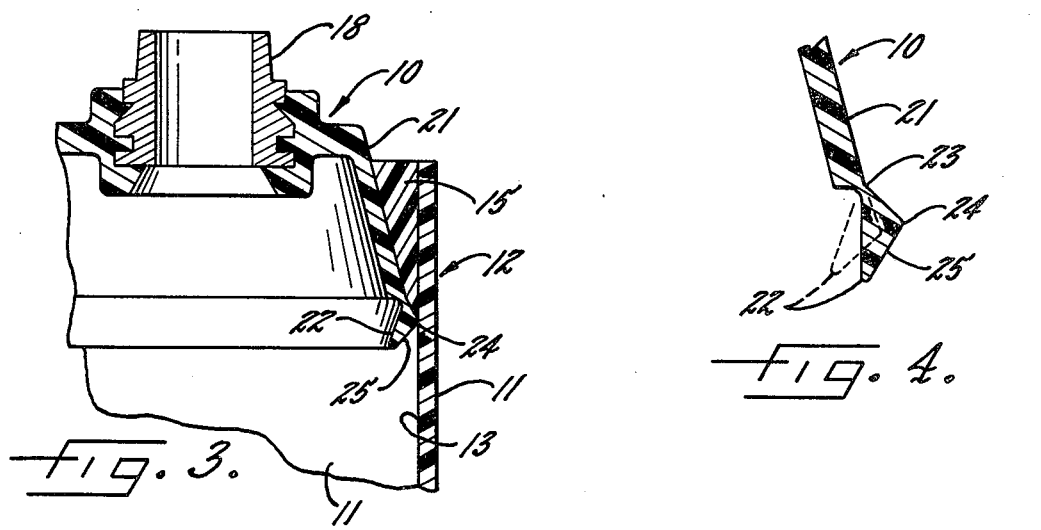
Fig. 3.
Fig. 4.

BATTERY CELL COVER ASSEMBLY

This invention relates generally to containers for electrical storage batteries, and more particularly concerns a cover and seal for such containers.

Secondary storage batteries, particularly the larger so-called industrial types, are often contained in box-like containers or jars defining open topped cells which are closed by covers fitted into the tops of the cells and sealed by flooding at least the edges of the cover with a settable sealing compound. A typical arrangement of this type is shown in U.S. Pat. No. 3,343,996, issued Sept. 26, 1967.

The tightness of such a cover seal is dependent on the amount of cover-container surface that is engaged by the sealing compound — a wide sealing band obviously making it less likely that some imperfections could create a leakage path. The effectiveness of such a seal, and the ease of making such a cover assembly, is also dependent on how well the cover fits into the jar top. A tight fit makes assembly difficult and tends to stress and distort the container and cover, whereas a loose fit can cause "rundowns" of the molten sealant when it is applied.

Accordingly, it is the aim of this invention to provide a battery cover assembly that insures a substantial sealing region between the sealant and both the cover and the jar through a relatively wide range of vertical cover positions. It is also an object of the invention to provide an assembly of the above kind which gives a proper cover-jar fit through a relatively wide range of size tolerances, thereby minimizing assembly problems, rundowns and container distortion.

Another object is to provide a cover assembly as characterized above which utilizes no special jar shape and in which the cover can be as economically formed as in prior cover designs.

Other objects and advantages of the invention will become apparent upon reading the following detailed description and upon reference to the drawings, in which:

FIG. 1 is a top plan of a cover made in accordance with the invention;

FIG. 2 is a section taken along the line 2—2 in FIG. 1;

FIG. 3 is a fragmentary section of a cover assembly embodying the cover of FIG. 1; and FIG. 4 is an enlarged fragmentary section showing alternate positions of the parts thereof assumed in the making of a cover assembly.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawing, there is shown a storage battery cover 10 intended for a battery cell cover assembly, shown in FIG. 3, wherein the cover 10 is fitted into the walls 11 of an open-topped jar 12 defining a cell 13, and a flowable, settable sealant 15 joins the cover 10 and the jar 12. As is conventional, the cover 10 and the jar 12 are formed of hard rubber or, preferably, resilient plastic, and the sealant 12 is a bituminous compound poured hot and molten into place where it hardens in sealing contact with both the cover and the jar.

The cover 10 includes a planar main body 16 in which is formed the usual cap receiving, vent collar 17 and a pair of lead terminal inserts 18 forming parts of terminal assemblies.

In accordance with the invention, the cover body 16 is surrounded by a depending, outwardly sloping skirt 21 whose lowest and greatest periphery is well within the opening of the walls 11, and having a plurality of straight, integral sealing strips 22 extending down from straight line, reduced thickness, hinge sections 23. The strips 22 define jar wall contacting lins 24 as well as camming surfaces 25 for swinging the strips 22 down and in upon insertion of the cover 10 into the top of the jar cell 13.

The relaxed, unstressed positions of the hinge sections 23 cause the contacting lines 24 to define a periphery well outside of the nominal dimension of the opening defined by the cell walls 11. Thus, considerable variation in tolerances between the cover and the jar can be accommodated by the sealing strips 22 swinging in (see FIG. 4) when the cover is inserted down into the jar. The ends of the strips 22 are flared but spaced to define notches 26 (see FIG. 1) so as to provide for inward swinging movement about the straight line hinge sections 23 without distortion of either the cover or the jar.

It will be appreciated that the engagement between the contacting lines 24 and the walls 11 is not, in itself, relied upon for sealing of the cell 13. This engagement need only be continuous enough to contain the relatively viscous hot sealing compound until the latter cools and sets. The true seal of the cell 13 is provided by the intimate contact between the hardened sealant 15 and both the cover 10 and the walls 11, and it can be seen that the cover 10 defines a deep groove for the sealant having a range of possible groove depths substantially equal to the depth of the cover skirt 21. Thus, the top of the cover 10 can be disposed well above the tops of the walls 11 (see FIG. 3) and there is still provided substantial sealing area defined by the sides of the sealant groove.

It can thus be seen that the cover 10, in cooperation with the simply formed jar 12, provides a battery cover assembly that insures substantial sealing regions between the sealant and both the cover and the jar through a rather wide range of vertical positions of the cover. Insertion of the cover 10 into the jar 12 is relatively simple because of the hinged strips 22 with their camming surface 25, and the permissible tolerances between the cover and the jar can be relatively great without altering the eventual cooperation of the parts.

It will further be appreciated by those skilled in the art that the cover 10 can be molded efficiently and economically in the conventional manner.

We claim:

1. In a battery cell cover assembly in which a cover is fitted into the walls of an open-topped jar and a flowable, settable sealant joins the cover and jar, the improvement comprising, a cover having a main planar body and a depending, outwardly sloping, surrounding skirt of substantial depth whose lowest and greatest periphery is well within the opening defined by said walls, said periphery being substantially straight sided, a plurality of sealing strips formed integrally with said skirt with one strip extending down from each straight side of the skirt, said skirt and said strips being formed of resilient material and being joined by straight line, reduced thickness hinge sections, said strips defining jar wall contacting lines and having a relaxed, unstressed position wherein said contacting lines of the sealing strips define a periphery well outside the dimensions of the opening defined by said walls, said strips also having a camming surface for swinging the strips down and in upon insertion of said cover into said jar to thereby form a deep groove for said sealant with a range of groove depth being substantially equal to the depth of said skirt.

2. A cell cover for a battery jar having a main planar body and a depending, outwardly sloping, surrounding skirt of substantial depth whose lowest and greatest periphery is well within the jar opening into which the cover is to be inserted, said periphery being substantially straight sided, a plurality of sealing strips formed integrally with said skirt with one strip extending down from each straight side of the skirt, said skirt and said strips being formed of resilient material and being joined by straight line, reduced thickness hinge sections, said strips defining jar wall contacting lines and having a relaxed, unstressed position wherein said contacting lines of the sealing strips define a periphery well outside the dimensions of said jar opening, said strips also having a camming surface for swinging the strips down and in upon insertion of said cover into said jar opening to thereby form a deep groove for said sealant with a range of groove depths being substantially equal to the depth of said skirt.

* * * * *